United States Patent [19]
Norell et al.

[11] 3,940,972
[45] Mar. 2, 1976

[54] CHROMATOGRAPHIC SEPARATION OF OLEFINS

[75] Inventors: John R. Norell; Lloyd E. Gardner, both of Bartlesville, Okla.

[73] Assignee: Phillips Petroleum Company, Bartlesville, Okla.

[22] Filed: June 28, 1974

[21] Appl. No.: 484,270

[52] U.S. Cl................ 73/23.1; 23/232 C; 55/67; 55/386
[51] Int. Cl.² .......................................... G01N 31/08
[58] Field of Search ......... 73/23.1; 55/67, 197, 386; 23/232 C, 254 R; 260/677, 681.5 C

[56] References Cited
UNITED STATES PATENTS

| | | |
|---|---|---|
| 2,395,957 | 3/1946 | Breuer ......................... 260/681.5 C |
| 2,449,793 | 9/1948 | Souders et al. ...................... 260/677 |
| 3,074,881 | 1/1963 | Jones ................................... 55/67 X |
| 3,212,322 | 10/1965 | Loyd ...................................... 73/23.1 |
| 3,257,609 | 6/1966 | Sanford et al. .................. 73/23.1 X |
| 3,653,840 | 4/1972 | Silas ................................ 73/23.1 X |

FOREIGN PATENTS OR APPLICATIONS 2,179,164  11/1973  France ............................... 73/23.1

*Primary Examiner*—Richard C. Queisser
*Assistant Examiner*—Stephen A. Kreitman

[57] ABSTRACT

A mixture of olefins is separated and analyzed by means of a chromatographic column which contains silver trifluoromethanesulfonate.

14 Claims, 2 Drawing Figures

CHROMATOGRAPHIC SEPARATION OF OLEFINS

Chromatographic analyzers have been developed extensively in recent years to analyze various types of fluid mixtures. However, it has been difficult to separate certain mixtures of olefins, particularly those containing both cis and trans isomers. In accordance with this invention, a new column for use in separating mixtures of olefins is provided by employing silver trifluoromethanesulfonate as the column packing. The sulfonate is advantageously deposited on an inert support, and it is preferred that a relatively high boiling solvent also be employed.

In the accompanying drawing.

Figure 1:
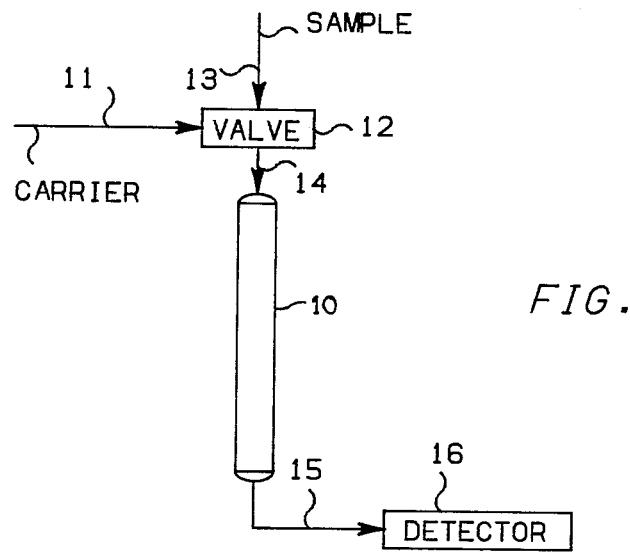
FIG. 1 is a schematic representation of a chromatographic analyzer which can include the separation column of this invention.

Referring now to the drawing in detail and to FIG. 1 in particular, there is shown a schematic representation of a chromatographic analyzer. The analyzer includes a column 10 which contains a suitable packing material. A carrier fluid, such as helium, nitrogen or other inert gas, is introduced through a conduit 11 which communicates with a sample valve 12. A sample of material to be analyzed is introduced into valve 12 through a conduit 13. Valve 12 can be a conventional rotary or diaphragm-operated sample valve which serves to introduce a predetermined volume of sample fluid into the carrier fluid when the valve is actuated. As an alternative, a predetermined volume of sample can be introduced into the column by a syringe. Sample valve 12 is connected to the inlet of column 10 by a conduit 14. The effluent from column 10 is directed through a conduit 15 to a detector 16.

In the normal operation of the chromatographic analyzer, the carrier fluid flows through column 10 initially to purge any sample residue remaining from a prior analysis. Valve 12 is then actuated to introduce a predetermined volume of the sample mixture into the column. The carrier fluid then continues to flow through the column to elute the constituents of the sample in sequence. The column effluent is passed to a detector which is an instrument capable of detecting changes in composition of the column effluent. Suitable detectors include thermistor and flame ionization detectors, for example, as well known to those skilled in the art.

In accordance with an embodiment of this invention, column 10 is filled with a packing material which comprises silver trifluoromethanesulfonate deposited on an inert adsorbent. This material is effective to separate mixtures of monoolefins containing 2 to about 12 carbon atoms. Diolefins having up to about 12 carbon atoms can also be separated. The term "olefins" as used herein thus includes both monoolefins and diolefins. These olefins are separated from alkanes that may be present in the mixture. The solid inert support can include calcined diatomaceous earth, crushed firebrick, and other inert adsorbents which are known for use as column packings. These materials are substantially inert under the analysis conditions and possess a porosity sufficient to adsorb a substantial quantity of liquid. The particle size of the support material can vary broadly from about 20 to about 200 mesh, with the particle size of about 40 to about 100 mesh being preferred.

It is preferred to employ a solvent (liquid phase) for the silver trifluoromethanesulfonate in addition to the silver trifluoromethanesulfonate. This liquid phase should be formed by a relatively high boiling material such as ethylene glycol, benzyl cyanide, polyethylene glycols, silicone oils, dimethyl sulfolane and the like. It is preferred that the material employed as the liquid phase have a relatively high boiling point in order to increase the useful operating temperature range.

Column packings containing ethylene glycol or benzyl cyanide as the liquid phase component can be used over the temperature range $-20°$ C. to $+50°$ C., but such packings are preferably used over the range of $15°$ C. to $30°$ C. Column packings containing polyethylene glycols of varying molecular weights can be used over the temperature range $0°$ to $185°$ C., but such packings are preferably used over the range of $25°$ C. to $125°$ C.

One method of preparing the packing material of this invention comprises dissolving the silver trifluoromethanesulfonate in a volatile diluent such as acetone, water, benzene, methanol, ethanol, diethyl ether, methyl ethyl ketone, acrylonitrile or the like. The resulting solution and the solvent are placed in contact with the support material to permit the sulfonate and solvent to become adsorbed. The volatile diluent is then removed to leave the column packing as a relatively dry free-flowing residue comprising silver trifluoromethanesulfonate, solvent and support. The amount of solvent employed generally comprises up to about 30 weight percent of the total packing material, preferably from about 2 to about 20 weight percent. The amount of silver trifluoromethanesulfonate can range from about 0.1 to about 20, preferably from about 1 to about 10 weight percent, based on the weight of the total packing material.

As previously mentioned, the packing material can be prepared without the high boiling solvent. However, such packings are generally not as effective as those which employ the solvent.

The following examples demonstrate this invention.

EXAMPLE I

Silver trifluoromethanesulfonate was prepared by slowly adding silver carbonate (13.42 g, 0.052 mol) and small amounts of water (total amount of water was 30 ml) to 14.60 grams (0.097 mol) trifluoromethanesulfonic acid dissolved in 100 ml of 1,1,2-trichloro-1,2,2-trifluoroethane contained in a flask. The solution was filtered to remove residual solids, and the two-phase filtrate was separated into organic and aqueous phases. The aqueous phase was evaporated to dryness to give 15.46 grams of silver salt. The salt was dissolved in 50 ml water; the solution was filtered; and the filtrate was evaporated to dryness. The residual silver trifluoromethanesulfonate was dried at $140°$ C. in a vacuum oven for four hours. The silver trifluoromethanesulfonate melted at $336°-338°$ C. and gave the following elemental analysis: % Ag, 44.24; % C, 4.79; % S, 12.5. Infrared spectral analysis showed major absorption peaks at 8.1, 8.6, 9.8 and 13.05 $\mu$, which are consistent with the indicated structure.

A mixture of 2.0 g of the silver trifluoromethanesulfonate, 5.0 g ethylene glycol solvent and 100 ml acetone diluent was contacted with 50.0 g of 60–80 mesh acid-washed Chromosorb P (60–80 mesh). Chromosorb refers to a class of chromatographic support materials prepared by calcining diatomaceous earth obtained from a marine deposit in Lompoc, California.

An additional 50 ml of acetone diluent was added and the slurry was stirred and then allowed to stand overnight at room temperature. Residual acetone diluent was removed on a rotary evaporator, and the remaining silver trifluoromethanesulfonate ethylene glycol-Chromosorb P column packing sample weighed 54.50 g. Assuming mechanical losses amounting to approximately 2.5 g, the column packing thus contained about 3.7 weight percent silver trifluoromethanesulfonate and about 9.2 weight percent ethylene glycol. This packing material is designated A in the following table. A second batch of packing material, designated B, was prepared in the same manner except that a total of 200 milliliters of acetone diluent was employed. Packing material B contained about 4.0 weight percent silver trifluoromethanesulfonate and about 9.0 weight percent ethylene glycol.

Packing materials A and B were employed in chromatographic columns of various dimensions as set forth in the following table. In each run, helium was employed as the carrier gas at the flow rates set forth. Samples of mixtures of olefins of components set forth in the table were introduced into the column as samples in volumes of about 2 microliters. A thermistor detector was employed as detector 16. All of the runs were conducted at about 24° C. except Run No. 3, which was conducted at about 30° C. The following results were obtained.

chromatogram obtained in Run No. 4. The constituents trans-butene-2, isobutylene, cis-butene-2, and butene-1 were eluted at respective times of 1.7, 3.0, 4.6 and 5.3 minutes, respectively, following sample injection into the column.

EXAMPLE II

Additional runs were carried out in accordance with the procedure of Example I wherein packed columns containing packing B were aged under an atmosphere of helium for different lengths of time to determine if the packing material retained its separating powers. In all of these runs, helium was employed as the carrier fluid and was introduced into the column at a rate of 50 cubic centimeters per minute. The following results were obtained.

TABLE II

| Run No. | Column Size | Olefin Mixture Components (RTM) | Column Aging Period (months) |
|---|---|---|---|
| 10 | 3/16" × 10' | trans-butene-2 (4.6), isobutylene (7.3), cis-butene-2 (11.3) and butene-1 (12.8) | 1 |
| 11 | 3/16" × 10' | trans-butene-2 (4.5), isobutylene (7.3), cis-butene-2 (11.0) and butene-1 (12.8) | 1 |
| 12 | 3/16" × 10' | trans-pentene-2 (7.3) and cis-pentene-2 (23.2) | 2 |
| 13 | 3/16" × 10' | trans-pentene-2 (7.2) and cis-pentene-2 (20.9) | 3 |
| 14 | 3/16" × 10' | trans-pentene-2 (7.3) and cis-pentene-2 (22.0) | 7 |

It can be seen from the foregoing table that the packing material of this invention is capable of separating mixtures of olefins after having been stored for prolonged periods of time.

EXAMPLE III

Several runs were carried out wherein silver trifluoromethanesulfonate was employed in conjunction with benzyl cyanide as the solvent in place of ethylene glycol. A mixture of 2.0 g silver trifluoromethanesulfonate, 5.0 g benzyl cyanide solvent and 100 ml acetone diluent was contacted with 50 g of 60–80 mesh acid-

TABLE I

| Run No. | Packing | Column Size | He Flow cc/min. | Olefin Mixture Components (RTM)[a] |
|---|---|---|---|---|
| 1 | B | ¼" × 6' | 80 | trans-pentene-2 (4.1) and cis-pentene-2 (13.1) |
| 2 | B | 3/16" × 10' | 50 | trans-pentene-2 (7.3) and cis-pentene-2 (23.2) |
| 3 | A | ¼" × 10' | 100 | trans-pentene-2 (4.5) and cis-pentene-2 (13.5) |
| 4 | B | ¼" × 6' | 80 | trans-butene-2 (1.7), isobutylene (3.0), cis-butene-2 (4.6) and butene-1 (5.3) |
| 5 | B | 3/16" × 10' | 50 | trans-butene-2 (3.2), isobutylene (6.0), cis-butene-2 (10.2) and butene-1 (12.0) |
| 6 | A | ¼" × 6' | 80 | 2-methylbutene-2 (1.8), 2-methylbutene-1 (5.4) and neohexane (8.6) |
| 7 | B | ¼" × 6' | 80 | trans-hexene-3 (5.4), 2-ethylbutene-1 (12.7) and cis-hexene-3 (16.7) |
| 8 | A | ¼" × 6' | 80 | trans-hexene-2 (4.9) and cis-hexene-2 (15.3) |
| 9 | A | ¼" × 6' | 80 | trans-pentene-2 (2.8) and cis-pentene-2 (8.9) |

[a]RTM represents the approximate retention time in the column (in minutes) of the designated component.

Figure 2:
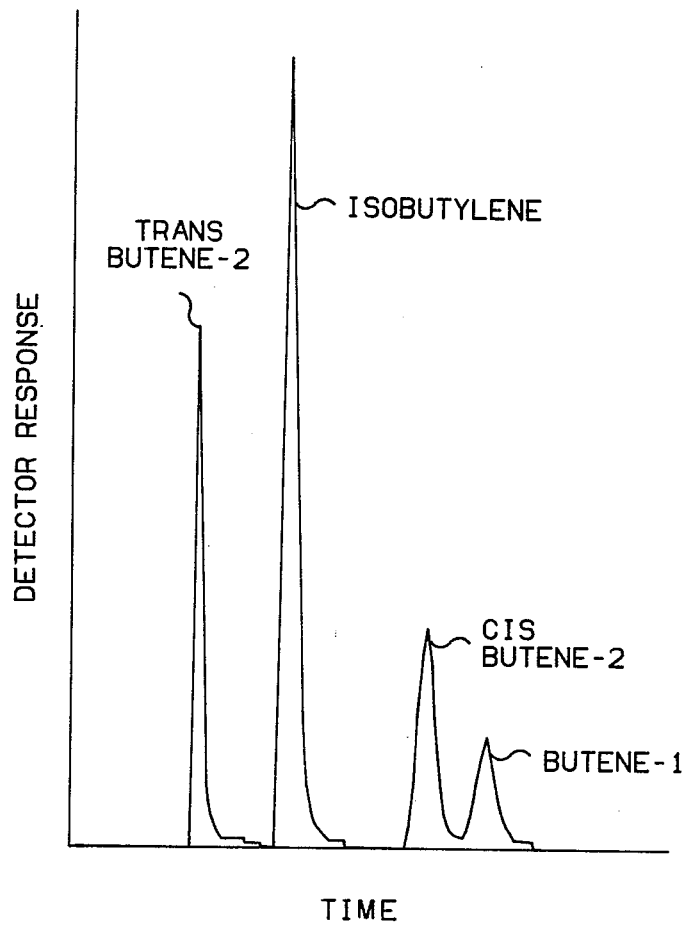
FIG. 2 illustrates a typical chromatogram obtained by use of the chromatographic column of this invention.

It can be seen from the foregoing table that the packing material of this invention is effective in separating various mixtures of olefins. This is evident from the differences in retention times of the constituents of the mixtures tested, which permit accurate identification of the constituents. For example, FIG. 2 illustrates the washed Chromosorb P and allowed to stand at room temperature for two hours. Acetone was removed on a rotary evaporator to leave the silver trifluoromethanesulfonate-benzyl cyanide-Chromosorb P packing as a relatively dry free-flowing solid. The following results were obtained.

TABLE III

| Run No. | Column Size | He Flow cc/min. | Olefin Mixture Components (RTM) |
|---|---|---|---|
| 15 | ¼" × 6' | 80 | trans-pentene-2 (2.3) and cis-pentene-2 (3.9) |
| 16 | ¼" × 6' | 80 | trans-hexene-2 (4.3) and cis-hexene-2 (7.6) |
| 17 | ¼" × 16' | 50 | trans-pentene-2 (9.7) and cis-pentene-2 (16.6) |

TABLE III-continued

| Run No. | Column Size | He Flow cc/min. | Olefin Mixture Components (RTM) |
|---|---|---|---|
| 18 | ¼" × 16' | 50 | trans-butene-2 (5.3), isobutylene (5.9), butene-1 (7.0) and cis-butene-2 (8.1) |
| 19 | ¼" × 16' | 100 | 2-methylbutene-2, 2-methylbutene-1 and neohexene (not resolved) |
| 20 | ¼" × 6' | 80 | 2-methylbutene-2, 2-methylbutene-1 and neohexene (not resolved) |

It can be seen from the data set forth in Table III that this packing material is also effective in separating mixtures of olefins. However, it was not possible to make a separation between the specific materials of Runs 19 and 20 under the conditions tested.

EXAMPLE IV

Several runs were conducted wherein silver trifluoromethanesulfonate was employed on Chromosorb packing without the use of a high boiling solvent. A mixture of 2.0 g silver trifluoromethanesulfonate and 100 ml acetone diluent was contacted and stirred with 19.32 g Chromosorb P (60–80 mesh) for a period of two hours. The acetone was removed at reduced pressure to give 21.62 g of column packing (10.5 wt. % $AgO_3SCF_3$ based on total weight of packing). This packing was used in a column (¼ inches x 8 feet) for the separation of trans and cis isomers of pentene-2. Initially the column gave a good separation of trans-pentene-2 (2.2 min) and cis-pentene-2 (8.4 min) at an operating temperature of about 30° C.; but after a week of constant helium flow over the temperature range of 25–100° C., the resolution was reduced (trans-pentene-2 eluted in 1.1 minutes and cis-pentene-2 eluted in 2.8 minutes) and tailing of the cis-pentene-2 isomer peak occurred.

EXAMPLE V

A run was conducted wherein silver trifluoromethanesulfonate was employed with squalane (2,6,10,15,19,23-hexamethyltetracosane) on Chromosorb packing. This packing was made by soaking for 2 hours 50 g of a commercial material comprising 20% squalane on Chromosorb P AW (60/80 mesh) in 200 cc acetone solution containing 4.0 g silver trifluoromethanesulfonate. The acetone was removed at reduced pressure to give a packing containing 8.3 wt. % $AgO_3SCF_3$ and 18.4 wt. % squalane. The packing was placed in a column (¼ inch × 10 feet) for separation of a mixture of cis- and trans-butene-2 and isobutylene. The trans-butene-2 and isobutylene eluted at 5.0 minutes and the cis-butene-2 eluted at 7.3 minutes using helium as the carrier gas at a flow rate 50 cc/min. and an operating temperature of about 24° /C.

EXAMPLE VI

Several runs were carried out to demonstrate the separations obtained by use of a column containing silver nitrate as the packing material. The columns contained 3% silver nitrate, 7% ethylene glycol and 90% Chromosorb p. The following results were obtained:

TABLE IV

| Run No. | Column Size | He Flow cc/min. | Temperature | Olefin Mixture Components (RTM) |
|---|---|---|---|---|
| 21 | ¼" × 10' | 100 | 30° C. | trans-pentene-2 (4.0) and cis-pentene-2 (6.0) |
| 22 | ¼" × 10'(b) | 50 | 24° C. | trans-butene-2 (1.9), isobutylene (2.3), cis-butene-2 (2.9) and butene-1 (3.1) |
| 23 | ¼" × 10'(b) | 50 | 24° C. | trans-pentne-2 (2.4) and cis-pentene-2 (4.3) |
| 24 | ¼" × 10'(c) | 50 | 24° C. | trans-pentene-2 (2.3) and cis-pentene-2 (2.7) |
| 25 | ¼" × 10'(c) | 50 | 24° C. | trans-pentene-2 (2.8) and cis-pentene-2 (2.9) |

(b)Column stored under He at room temperature for 2 weeks.
(c)Column stored under He at room temperature for 3½ months.

These runs demonstrate that silver nitrate is not nearly as effective in separating olefins as is the compound of this invention.

EXAMPLE VII

A mixture of normal pentane, trans-pentene-2 and cis-pentene-2 was separated in a column ¼ inch × 10 feet containing packing material B. The respective retention times of these three constituents were 1.8, 5.1 and 14.3 minutes, respectively, thus showing that normal pentane is separated from the olefins. In a column of the same material, butadiene had a retention time of 7.8 minutes.

In view of the foregoing description and examples, it can be seen that an improved method of analyzing olefins is provided in accordance with this invention. In addition, the method can be employed to separate olefins by collecting the column effluent separately at the different elution times. The carrier gas can be separated from the olefins to provide pure olefins.

While the invention has been described in conjunction with presently preferred embodiments, it obviously is not limited thereto.

What is claimed is:

1. The method of analyzing a mixture containing olefins which comprises introducing a sample of the mixture to be analyzed into a chromatographic column containing silver trifluoromethanesulfonate, passing a carrier fluid through the column to elute sequentially the olefin constituents of the sample, and measuring a property of the column effluent which is representative of changes in composition thereof.

2. The method of claim 1 wherein the sample is introduced into a column containing (1) silver trifluormethanesulfonate supported on an inert solid particulate material and (2) a solvent forming a liquid phase.

3. The method of claim 2 wherein the silver trifluoromethanesulfonate comprises about 0.1 to about 20 weight percent of the total of the particulate material, solvent and silver trifluoromethanesulfonate.

4. The method of claim 2 wherein the solvent comprises ethylene glycol, benzyl cyanide or squalane.

5. The method of claim 4 wherein the particulate material is diatomaceous earth.

6. The method of claim 1 wherein the carrier fluid is helium.

7. The method of claim 1 wherein the sample is introduced into a column containing silver trifluoromethanesulfonate supported on an inert solid particulate material.

8. The method of separating a mixture containing olefins which comprises introducing a volume of the mixture into a zone containing silver trifluoromethanesulfonate, and passing a carrier fluid through the zone to elute sequentially the olefin constituents of the mixture.

9. The method of claim 8 wherein the sample is introduced into a zone containing (1) silver trifluoromethanesulfonate supported on an inert solid particulate material and (2) a solvent forming a liquid phase.

10. A chromatographic column comprising a conduit having disposed therein (1) a mass of an inert solid particulate material having deposited thereon silver trifluoromethanesulfonate and (2) a solvent forming a liquid phase.

11. The column of claim 10 wherein the solvent comprises ethylene glycol, benzyl cyanide or squalane.

12. The column of claim 11 wherein the particulate material is diatomaceous earth.

13. A composition adapted for use as packing in a chromatographic column comprising inert solid particulate material having deposited thereon silver trifluoromethanesulfonate and also having a liquid deposited thereon to form a liquid phase when the composition is used as packing in a chromatographic column.

14. The method of analyzing a mixture containing monoolefins which comprises introducing a sample of the mixture to be analyzed into a chromatographic column containing silver trifluoromethanesulfonate, passing a carrier fluid through the column to elute sequentially the monoolefin constituents of the sample, and measuring a property of the column effluent which is representative of changes in composition thereof.

* * * * *